United States Patent
Inokuchi et al.

(10) Patent No.: US 7,373,580 B2
(45) Date of Patent: May 13, 2008

(54) RECORDING MEDIUM, RECORDING METHOD AND APPARATUS, REPRODUCTION METHOD AND APPARATUS, DATA TRANSMISSION METHOD, AND DATA DEMODULATION METHOD

(75) Inventors: Tatsuya Inokuchi, Tokyo (JP); Yoichiro Sako, Tokyo (JP); Shunsuke Furukawa, Tokyo (JP); Takashi Kihara, Chiba (JP)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 10/472,492

(22) PCT Filed: Jan. 22, 2003

(86) PCT No.: PCT/JP03/00526

§ 371 (c)(1),
(2), (4) Date: Sep. 30, 2003

(87) PCT Pub. No.: WO03/065363

PCT Pub. Date: Aug. 7, 2003

(65) Prior Publication Data

US 2004/0139381 A1    Jul. 15, 2004

(30) Foreign Application Priority Data

Jan. 31, 2002    (JP) ............................. 2002-024496

(51) Int. Cl.
*H03M 13/00*    (2006.01)

(52) U.S. Cl. ....................... 714/752; 714/786

(58) Field of Classification Search ................ 714/755, 714/756, 784, 752
See application file for complete search history.

(56) References Cited

U.S. PATENT DOCUMENTS

| | | | | |
|---|---|---|---|---|
| 5,841,749 | A | * | 11/1998 | Sako ........................ 369/59.26 |
| 6,076,165 | A | | 6/2000 | Maenza |
| 6,519,217 | B1 | * | 2/2003 | Kawashima et al. ....... 369/53.2 |
| 6,580,684 | B2 | * | 6/2003 | Miyake et al. ........... 369/275.3 |
| 6,614,846 | B1 | * | 9/2003 | Fujiwara et al. ....... 375/240.16 |

FOREIGN PATENT DOCUMENTS

| | | |
|---|---|---|
| EP | 0 756 279 A2 | 1/1997 |
| EP | 1 143 443 A2 | 10/2001 |
| EP | 1 148 488 A2 | 10/2001 |
| EP | 1 457 985 A1 | 9/2004 |
| JP | 8-129828 | 5/1996 |
| JP | 9-50677 | 2/1997 |
| JP | 2000-207829 | 7/2000 |
| JP | 2001-94543 | 4/2001 |

(Continued)

*Primary Examiner*—Guy Lamarre
*Assistant Examiner*—Esaw Abraham
(74) *Attorney, Agent, or Firm*—Oblon, Spivak, McClelland, Maier & Neustadt, P.C.

(57) ABSTRACT

A recording medium including an area in which data that has been encoded with a first error correction code is recorded. Data that can be decoded with a second error correction code that is different from the first error correction code is recorded to the area along with the data that has been encoded with the first error correction code. The data that can be decoded with the second error correction code composes at least part of encryption key data.

39 Claims, 17 Drawing Sheets

| FOREIGN PATENT DOCUMENTS | | | | | |
|---|---|---|---|---|---|
| JP | 2001-143270 | 5/2001 | WO | WO 95/03655 | 2/1995 |
| JP | 2001-507849 | 6/2001 | WO | WO 98/54713 | 12/1998 |
| JP | 2002-500796 | 1/2002 | | | |

* cited by examiner

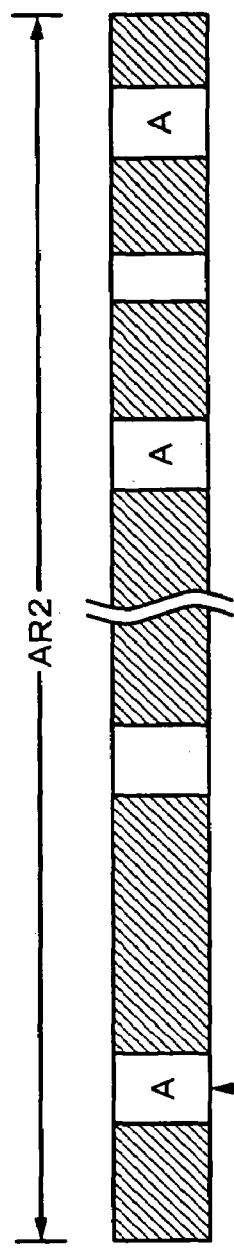
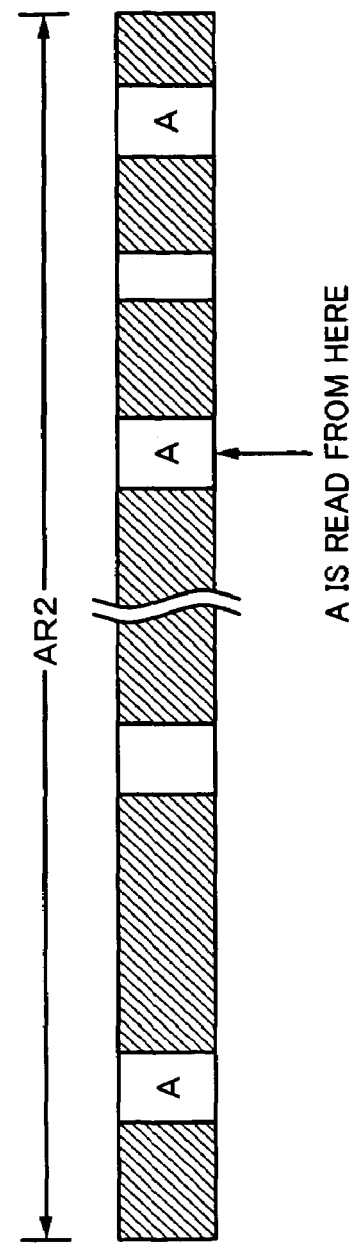

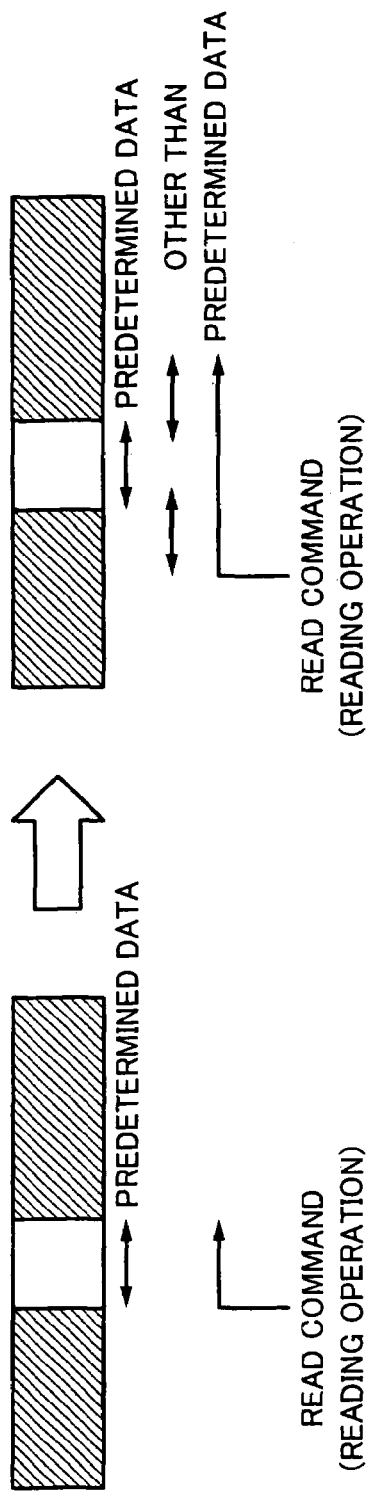
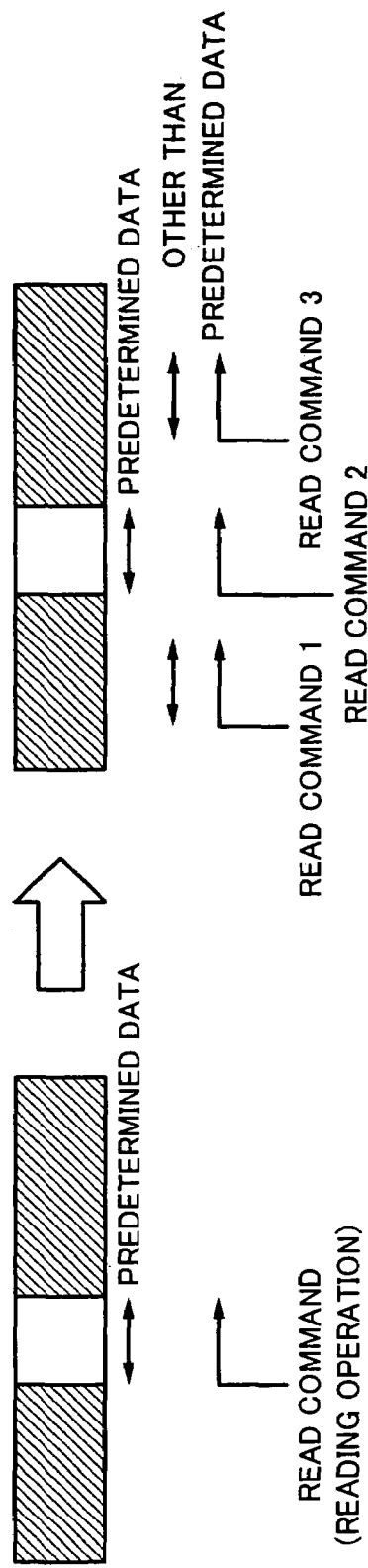

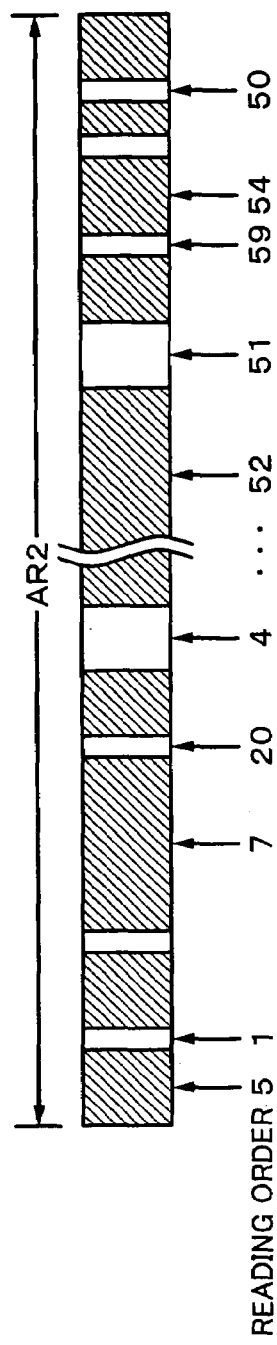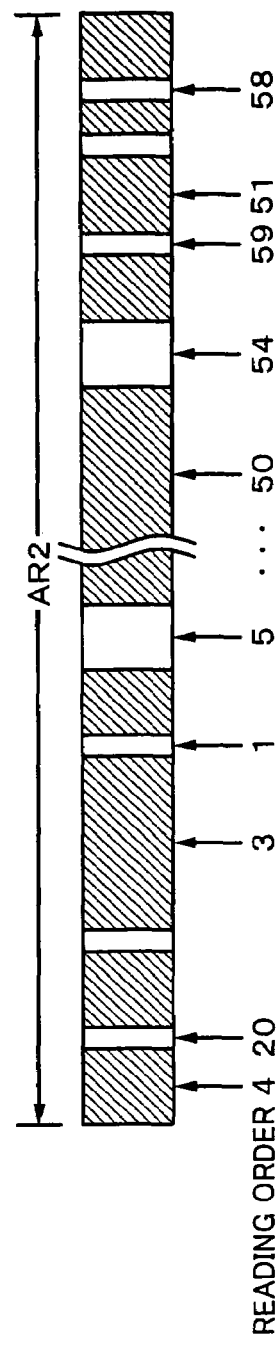
Fig. 16A
Fig. 16B

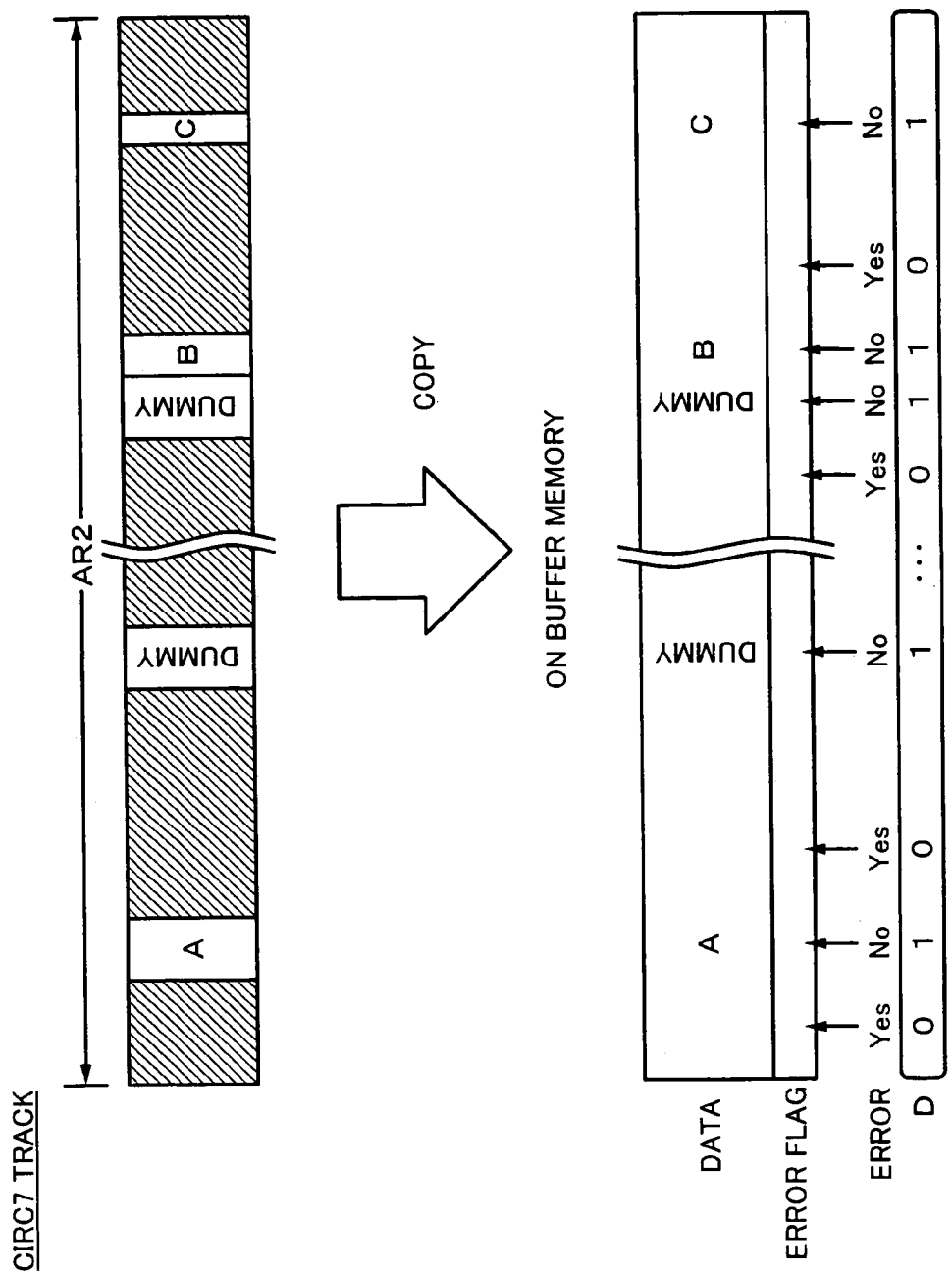

RECORDING MEDIUM, RECORDING METHOD AND APPARATUS, REPRODUCTION METHOD AND APPARATUS, DATA TRANSMISSION METHOD, AND DATA DEMODULATION METHOD

TECHNICAL FIELD

The present invention relates to a recording medium on which content data is recorded, a recording method, a recording apparatus, a reproducing method, a reproducing apparatus, a data transmitting method, and a data decrypting method.

BACKGROUND ART

Since optical discs such as a CD (Compact Disc) and a CD-ROM (Compact Disc Read Only Memory) are easy to handle and are produced at relatively low cost, they have been widely used as recording mediums for storing data. In recent years, a CD-R (Compact Disc Recordable) disc, on which data can be recorded once, and a CD-RW (Compact disc ReWritable) disc, on which data can be rewritten, have come out. Thus, data can be more easily recorded on such optical discs than before. As a result, optical discs such as a CD-DA (Compact Disc Digital Audio) disc, a CD-ROM disc, a CD-R disc, and a CD-RW disc have become the mainstream of data recording mediums. In addition, in recent years, audio data is compressed according to compression-encoding systems such as the MP3 (MPEG1 Audio Layer-3) and the ATRAC (Adaptive TRansform Acoustic Coding) 3 and recorded on the CD-ROM disc, the CD-R disc, the CD-RW disc, and so forth.

However, as the CD-R disc and the CD-RW disc have come out, data recoded on the CD-DA disc can be more easily copied than before. As a result, a problem about copyright protection has arisen. Thus, when content data is recorded to the CD-R disc or the CD-RW disc, it is necessary to take measures to protect content data.

As one method for protecting content data recorded on the CD-DA disc, the content data is encrypted and recorded on the CD-DA disc. When content data is encrypted and recorded on a disc, unless key data with which the content data is decrypted is obtained, the content data cannot be decrypted. Thus, the content data can be protected.

However, when encryption key data and a disc are separately distributed, a particular system is required and becomes troublesome. Thus, it is preferred to bury encryption key data on a disc. However, it was difficult to record encryption key data on a disc in such a manner that the encryption key data cannot be easily known. That is because it is necessary to prevent buried encryption key data from adversely affecting a conventional CD player, which has been widely used.

SUMMARY OF THE INVENTION

Therefore, an object of the present invention is to provide a recording medium, a recording method, a recording apparatus, a reproducing method, a reproducing apparatus, a data transmitting method, and a data decrypting method that allow copyright to be securely protected using buried encryption key data with which encrypted data is decrypted.

DISCLOSURE OF THE INVENTION

One aspect of the present invention is a recording medium having an area in which data that has been encoded with a first error correction code is recorded, wherein data that can be decoded with a second error correction code that is different from the first error correction code is recorded to the area along with the data that has been encoded with the first error correction code, and wherein the data that can be decoded with the second error correction code composes at least part of encryption key data.

Another aspect of the present invention is a recording method for a recording medium, comprising the steps of recording data that has been encoded with a first error correction code to a recording area of the recording medium; and recording data that composes at least a part of encryption key data and that can be decoded with a second error correction code that is different from the first error correction code to the area along with the data that has been encoded with the first error correction code.

Another aspect of the present invention is a recording method for a recording medium, comprising the step of recording data that has been encoded with a first error correction code to an area of the recording medium along with a plurality of pieces of data that can be decoded with the first error correction code and that can be also decoded with a second error correction code that is different from the first error correction code as a pattern that represents at least a part of the encryption key data.

Another aspect of the present invention is a recording apparatus for a recording medium, comprising an encoding process portion for performing an encoding process including an error correction code encoding process for input data with a first error correction code; a recording portion for receiving output data of the encoding process portion and recording the received data to the recording medium; and a generating portion for generating data that can be decoded with the first error correction code, that composes at least a part of encryption key data, and that can be decoded with a second error correction code that is different from the first error correction code and supplying the generated data to the encoding process portion.

Another aspect of the present invention is a reproducing method for a recoding medium, comprising the steps of decoding data that is read from an area of the recording medium, data that has been encrypted and that has been encoded with a first error correction code being recorded to the area, in the area, data that can be decoded with a second error correction code that is different from the first error correction code being recorded along with the data encoded with the first error correction code; generating decryption key data using data that has been decoded with at least the second correction code; and decrypting the data that has been encoded with the first error correction code using the generated key data.

Another aspect of the present invention is a reproducing apparatus for a recoding medium, comprising a head portion for reading data from the recording medium, data that has been encrypted and that has been encoded with a first error correction code being recorded to the area, in the area, data that can be decoded with a second error correction code that is different from the first error correction code being recorded along with the data encoded with the first error correction code; a decoding process portion for performing a decoding process for an output signal of the head portion; a generating portion for decoding output data of the decoding process portion with the second error correction code and generating decryption key data using data that has been decoded with at least the second correction code; and a decrypting portion for decrypting output data of the decoding process portion using the generated key data.

Another aspect of the present invention is a data transmitting method, comprising the step of outputting data that has been encoded with a first error correction code along with data that composes a part of encryption key data that can be decoded with the first error correction code and that can be also decoded with a second error correction code that is different from the first error correction code.

Another aspect of the present invention is a data decrypting method, comprising the steps of decoding data with a second error correction code, the data having been received as data that has been encrypted and that has been encoded with a first error correction code along with data that can be decoded with a second error correction code that is different from the first error correction code; generating decryption key data using data that has been decoded with at least the second error code; and decrypting the data that has been encoded with the first error correction code using the generated key data.

On an optical disc as a data recording medium, an area that has been encoded according to the CIRC7 system that is a first error correction code is formed. Content data is encrypted, encoded according to the CIRC4 system that is a second error correction code, and recorded. In the area in which data has been encoded according to the CIRC7 system, data that can be corrected according to both the CIRC4 system and the CIRC7 system is recorded at a predetermined position in a predetermined pattern. As the data that can be corrected according to both the CIRC4 system and the CIRC7 system, predetermined data is repeated in the unit of a C1 sequence. When data is decoded in those areas, data that can be corrected is obtained. When data is decoded according to the CIRC4 system, information that represents whether or not there is a correction impossible error is obtained. That data and information are used as an encryption key.

According to the present invention, an encryption key can be recorded without influence of a conventional CD drive and a conventional CD-ROM. To improve the secrecy of the encryption key, the position of the area on the disc, the position of data in the area, and so forth are kept secret. Preferably, the structure of data in the area is changed for each disc and for each stamper. In addition, when the encryption key is read from the area, by various measures, the secrecy of the encryption key is improved.

BRIEF DESCRIPTION OF DRAWINGS

FIGS. 13A and B are schematic diagrams for describing an area that has been encoded according to the CIRC7 system on the optical disc according to the present invention.

FIGS. 15A and B are schematic diagrams for describing an area that has been encoded according to the CIRC7 system on the optical system according to the present invention.

FIGS. 16A and B are schematic diagrams for describing an area that has been encoded according to the CIRC7 system on the optical disc according to the present invention.

FIG. 17 is a schematic diagram for describing an area that has been encoded according to the CIRC7 system on the optical disc according to the present invention.

BEST MODES FOR CARRYING OUT THE INVENTION

Next, with reference to the accompanying drawings, an embodiment of the present invention will be described. As a recording medium according to the present invention, a multi-session optical disc is used. The optical disc according to the present invention has almost the same physical standard such as size as a CD. Information on the optical disc can be optically read by a conventional CD player and a CD-ROM drive.

On the optical disc according to the present invention, encrypted content data has been recorded. The encrypted content data is for example CD-ROM format or CD-DA format audio or video content data that has been encrypted. As an example of the encrypting system, the DES (Data Encryption Standard) can be used. The DES is a block encoding system of which plain text is block-segmented and encrypted block by block. In the DES, an input of 64 bits is encrypted with key data of 64 bits (a key of 56 bits and a parity of eight bits). As a result, 64 bits are output. Alternatively, another encrypting system other than the DES can be used, although the DES is a common key system that use the key data for both encryption and decryption. Alternatively, the RSA encryption, which is a public key encryption that use different key data for encryption and decryption, may be used. When necessary, content data has been compression-encoded according to the ATRAC3 (Adaptive TRansform Acoustic Coding 3), the MP3 (MPEG 1 Audio Layer-3), the AAC (MPEG Advanced Audio Coding), the TwinVQ, or the like.

Figure 1:
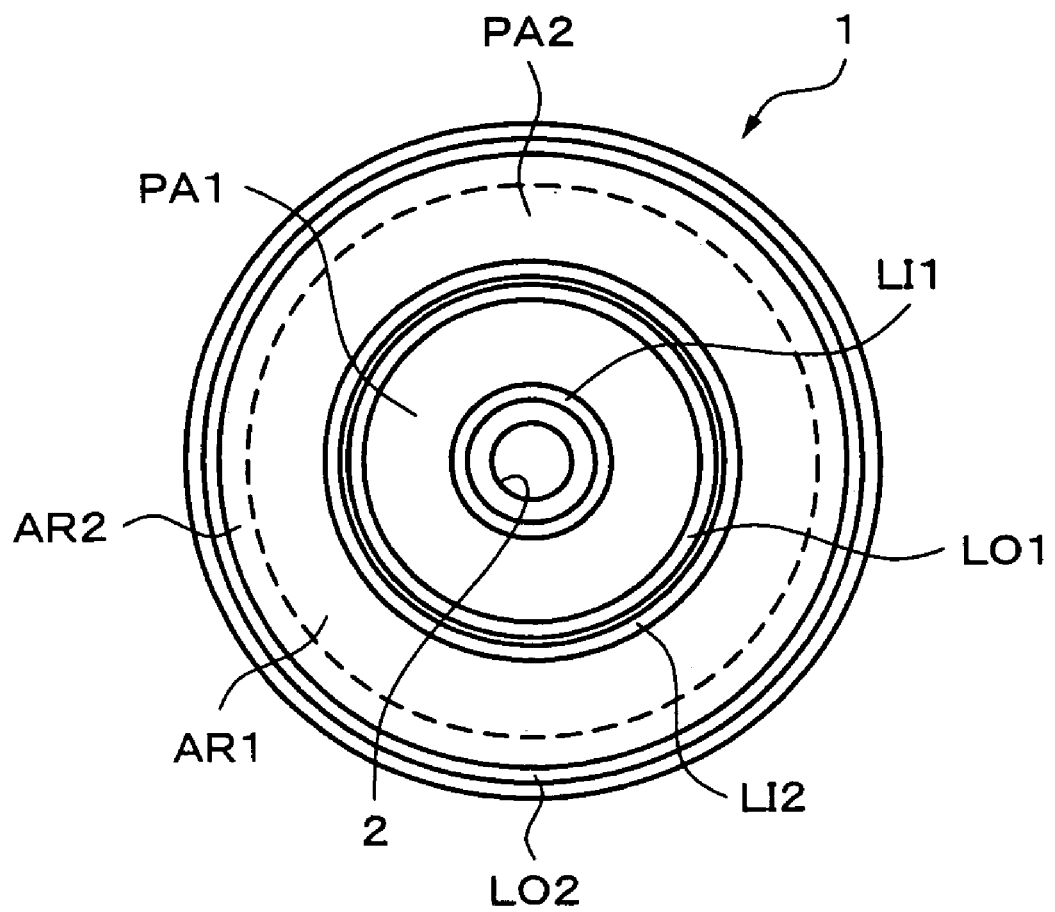
FIG. 1 is a plan view for describing an optical disc according to the present invention.

As shown in FIG. 1, the optical disc 1 according to the present invention has a diameter of 120 mm. At the center of the optical disc 1, a hole 2 is formed. The optical disc 1 may have a diameter of 80 mm, which is same as so-called CD single disc.

As the optical disc 1, there are a reproduction-only disc, a recordable disc, and a rewritable disc.

When the optical disc 1 is a reproduction-only optical disc, a reflection film made of aluminum is formed as a recording layer. When the optical disc 1 is a reproduction-only optical disc, data is recorded as physical pits. Normally, the disc is produced by an injection molding method using a stamper.

When the optical disc 1 is a rewritable optical disc, an organic coloring matter such as phthalocyanine or cyanine is used for a recording layer. When data is written to the recordable optical disc, the temperature of the recording layer made of an organic coloring matter of the disc is raised by a laser beam. As a result, the recording layer made of the organic coloring matter is thermally deformed.

When the optical disc 1 is a rewritable optical disc, a phase change material is used for a recording layer. As an example of the phase change material, an alloy of Ag—In—Sb—Te (silver-indium-antimony-tellurium) is used. Such a phase change material has a crystal phase and an amorphous phase. When the intensity of the laser beam is strong, the recording layer made of the phase change material is heated over its melting point and then rapidly cooled. As a result, the recording layer made of the phase change material becomes the amorphous state. When the intensity of the laser beam is relatively weak, the recording layer made of the phase change material is heated to around the crystallization temperature and then gradually cooled. As a result, the recording material becomes the crystallization state. As a result, data is recorded to the optical disc 1 or erased therefrom.

Figure 2:
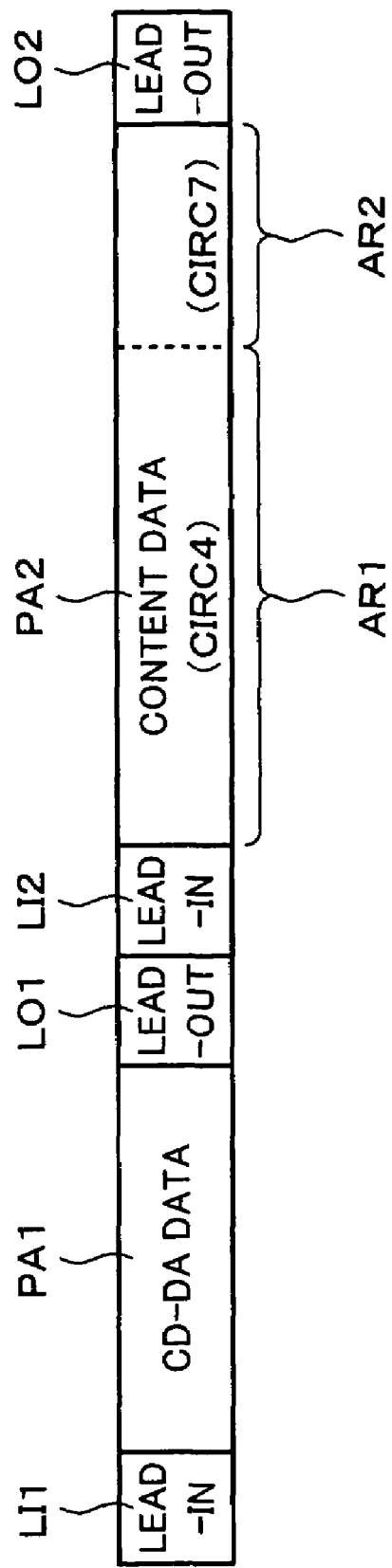
FIG. 2 is a schematic diagram for describing the optical disc according to the present invention.

As shown in FIG. 1 and FIG. 2, on the innermost periphery of the optical disc 1, a first lead-in area LI1 is formed. On an outer periphery of the area LI1, a first program area PA1 is formed. Outside the first program area PA1, a first lead-out area LO1 is formed. In the first program area PA1, in the same recording format as the CD-DA standard, audio data is recorded. Since the recording format of data in the first program area PA1 is the same as that of the CD-DA standard and the data has not been encrypted, the data can be reproduced by a conventional music reproduction CD player.

Outside the first lead-out area LO1, a second lead-in area LI2 is formed. On an outer periphery of the area LI2, a second program area PA2 is formed. Outside the second program area PA2, a second lead-out area LO2 is formed. In the second program area PA2, as content data, audio data that has been compressed according to a compression-encoding system such as the ATRAC3 is encrypted and recorded.

In addition, the second program area PA2 contains two areas AR1 and AR2 that are different in error correction code encoding systems. In the area AR1, data is encoded with an error correction code according to the same error correction code encoding system as that of a conventional CD-DA disc and a conventional CD-ROM disc (hereinafter, that system is referred to as CIRC (Cross Interleave Reed-Solomon Code) 4 system) and recorded. In the area AR2, data is encoded with an error correction code according to an error correction code encoding system that will be used for a double-density CD disc (hereinafter that system is referred to as CIRC7 system) and recorded. As will be described above, in the area AR2, a pattern of data that can be also corrected according to the CIRC4 system is contained.

In the program area AR1, to have compatibility with the CD-DA standard, data is encoded with an error correction code according to the CIRC4 system.

Normally, an error correction code is added to detect a burst error and a random error and perform a correcting process. As will be described later, according to the embodiment, using characteristics of error correction codes according to the CIRC4 system and the CIRC7 system, an encryption key is buried in the area AR2.

In CDs, as an error correction code encoding system, a CIRC of which an error correction code encoding process is dually performed for a C1 sequence (in the vertical direction) and a C2 sequence (in the diagonal direction) is used. Data that has been encoded with the error correction code is EFM (eight to fourteen modulation) modulated in the unit of one frame and recorded.

Figure 3:
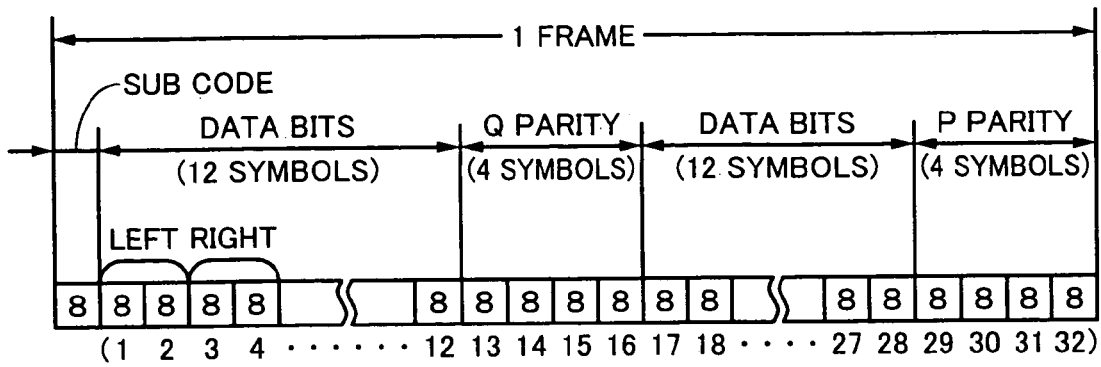
FIG. 3 is a schematic diagram for describing a recording format of the optical disc according to the present invention.

FIG. 3 shows one frame of a CD data structure that has not been EFM modulated. As shown in FIG. 3, when audio data is sampled with 16 bits, one frame is composed of 24 symbols of data bits, four symbols of a Q parity, four symbols of a P parity, and one symbol of a sub code. 24 symbols of data bits are composed of six samples on the left (L) and six samples on the right (R). One symbol is made of eight bits of which 16 bits are divided by two. Data of one frame recorded on the disc is converted from eight bits into 14 bits by the EFM modulation. In addition, a direct current component suppression bit and a frame sync are added to data of one frame.

Thus, one frame recorded on the disc is composed of:

| | |
|---|---|
| Frame sync | 24 channel bits |
| Data bits | 14 · 24 = 336 channel bits |
| Sub code | 14 channel bits |
| Parity | 14 · 8 = 112 channel bits |
| Margin bits | 3 · 34 = 102 channel bits |

Thus, the total channel bits of one frame are 588 channel bits.

Figure 4:
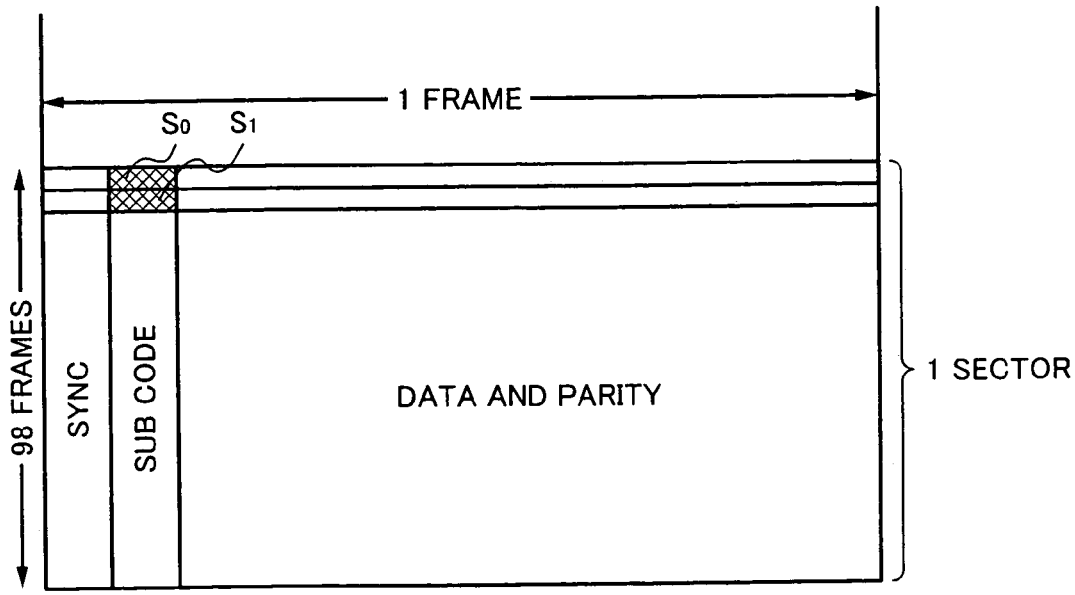
FIG. 4 is a schematic diagram for describing the recording format of the optical disc according to the present invention.

A collection of 98 frames is referred to as one sub code frame. One sub code frame is equivalent to 1/75 second of a reproduction time of a conventional CD. FIG. 4 shows a sub code frame of which 98 frames are rearranged so that they are successive in the vertical direction. One symbol of a sub code of each frame contains bits of eight channels P to W. As shown in FIG. 4, one sector is composed of data in the period (98 frames) for sub code. The first two frames of 98 frames are sub code frame syncs S0 and S1. When data is recorded to an optical disc such as a CD-ROM, one sector is composed of 98 frames (2,352 bytes), which is a sub code completion unit.

Figure 5:
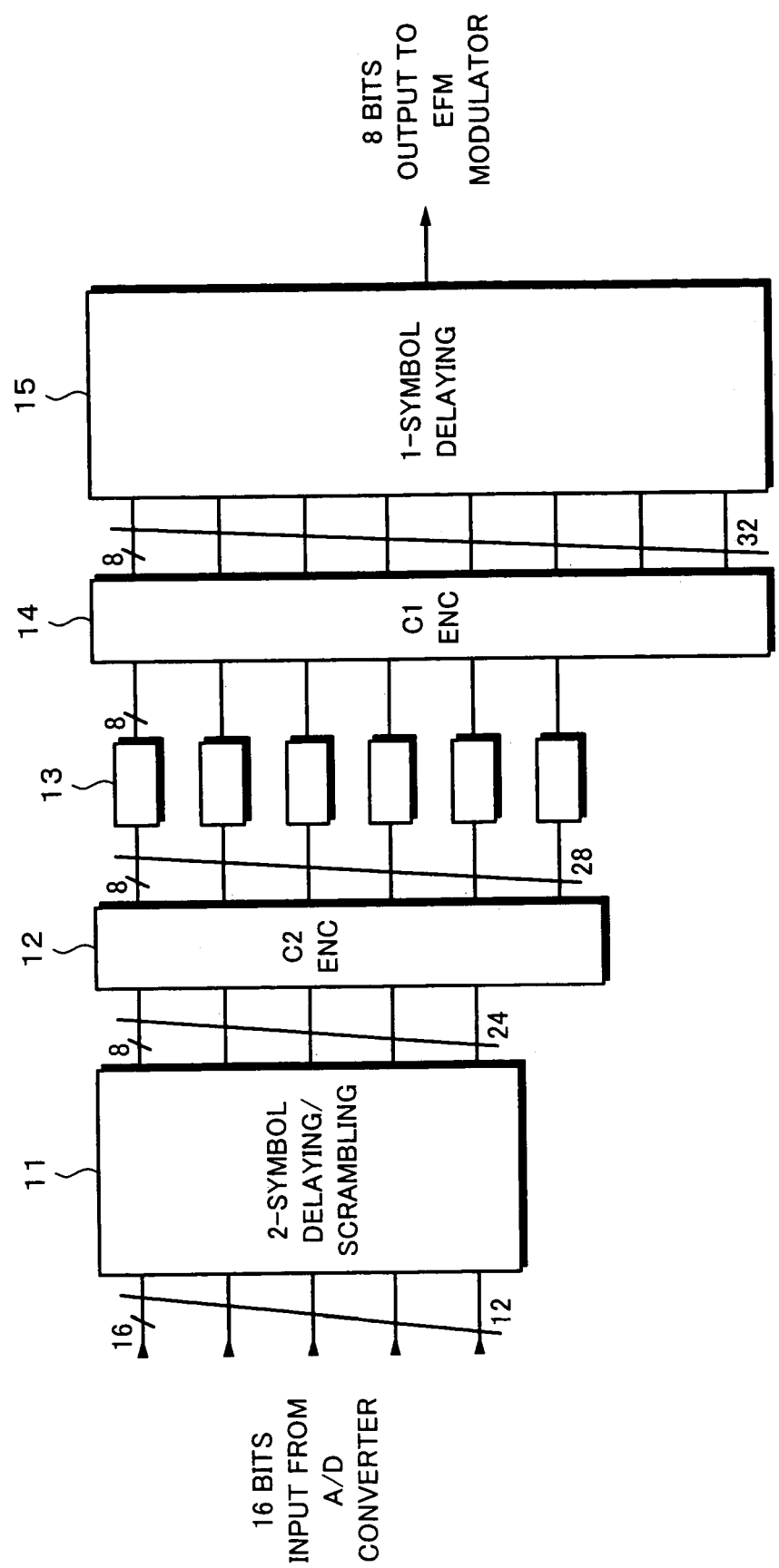
FIG. 5 is a block diagram showing an example of a CIRC encoder.
Figure 6:
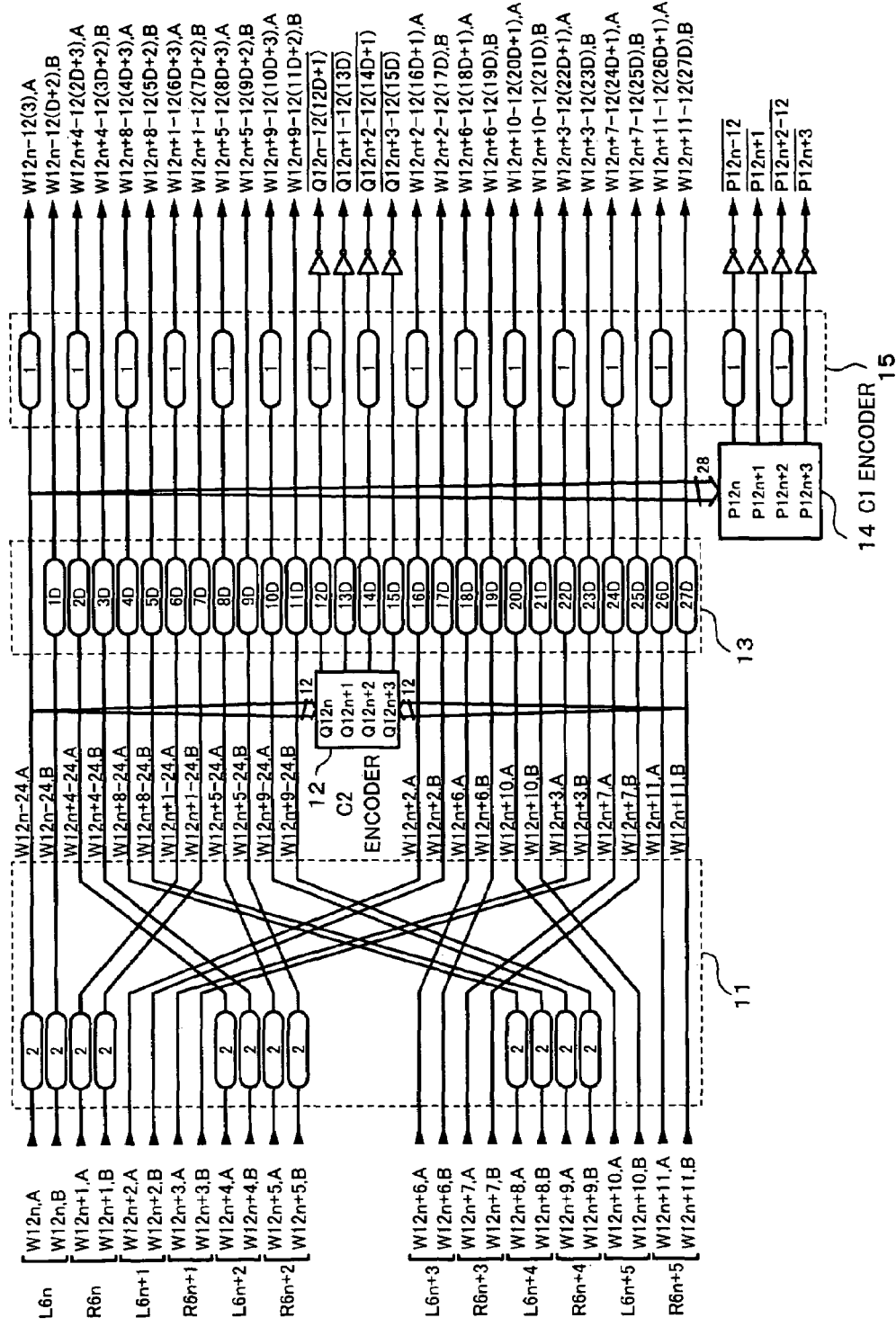
FIG. 6 is a detailed block diagram showing the example of the CIRC encoder.

FIG. 5 and FIG. 6 are block diagrams showing a flow of an encoding process according to the CIRC system. For simplicity, the encoding process/decoding process according to the CIRC system will be described for audio data.

24 symbols (W12$n$,A, W12$n$,B, . . . , W12$n$+11,A, W12$n$+11,B) of which one word of an audio signal is divided into high order eight bits and low order eight bits) (high order eight bits are denoted by A and lower eight bits by B) are supplied to a two-symbol delaying/scrambling circuit 11. The two-symbol delaying/scrambling circuit 11 delays each of the even word data L6$n$, R6$n$, L6$n$+2, R6$n$+2, . . . by two symbols. Even if all the corresponding sequence has an error in a C2 encoder 12, the two-symbol delaying/scrambling circuit 11 interpolates it. The two-symbol delaying/scrambling circuit 11 scrambles the 24 symbols so that the maximum burst error interpolation length can be obtained.

Outputs of the two-symbol delaying/scrambling circuit 11 are supplied to the C2 encoder 12. The C2 encoder 12 encodes (28, 24, 5) Reed-Solomon code on the Galois field GF (28) and generates four-symbol Q parities Q12$n$, Q12+1, Q12$n$+2, and Q12$n$+3.

28 symbols that are output from the C2 encoder 12 are supplied to an interleaving circuit 13. The interleaving circuit 13 assigns delay amounts that vary in arithmetic progression such as 0, D, 2D, . . . , (where D represents a unit delay amount) to each symbol so as to change one array of a symbol to a second array.

Outputs of the interleaving circuit 13 are The C1 encoder 14 generates four-symbol P parities P12$n$, P12$n$+1, P12$n$+2, and P12$n$+3. The minimum distance of each of the C1 code and C2 code is 5. Thus, the C1 encoder 14 can correct a two-symbol error and erasure-correct a four-symbol error (in the case that the position of an error symbol is known).

32 symbols that are output from the C1 encoder 14 are supplied to a one-symbol delaying circuit 15. The one-symbol delaying circuit 15 separates adjacent symbols so as to prevent an error that spreads over a boundary of one symbol from resulting in a two-symbol error. The Q parity is inverted by an inverter. Thus, even if all data and parities become zero, an error can be detected.

The unit delay amount D of the interleaving circuit 13 according to the CIRC4 system is different from that according to the CIRC7 system. The interleaving circuit 13 disperses a burst error.

In other words, according to the CIRC4 system, the interleaving circuit 13 designates D=4 frames and separates adjacent symbols by four frames each. The CIRC4 system of D=4 frames is used in the current CD-DA. According to the CIRC4 system, the maximum delay amount becomes 27D (=108 frames). The total interleave length becomes 109 frames.

According to the CIRC7 system, the interleaving circuit 13 designates D=7 frames and separates adjacent symbols by seven frames each. The CIRC7 system of D=7 frames has been proposed for a double density CD. According to the CIRC7 system, the maximum delay amount becomes 27D (=189 frames). The total interleave length becomes 190 frames.

Figure 7:
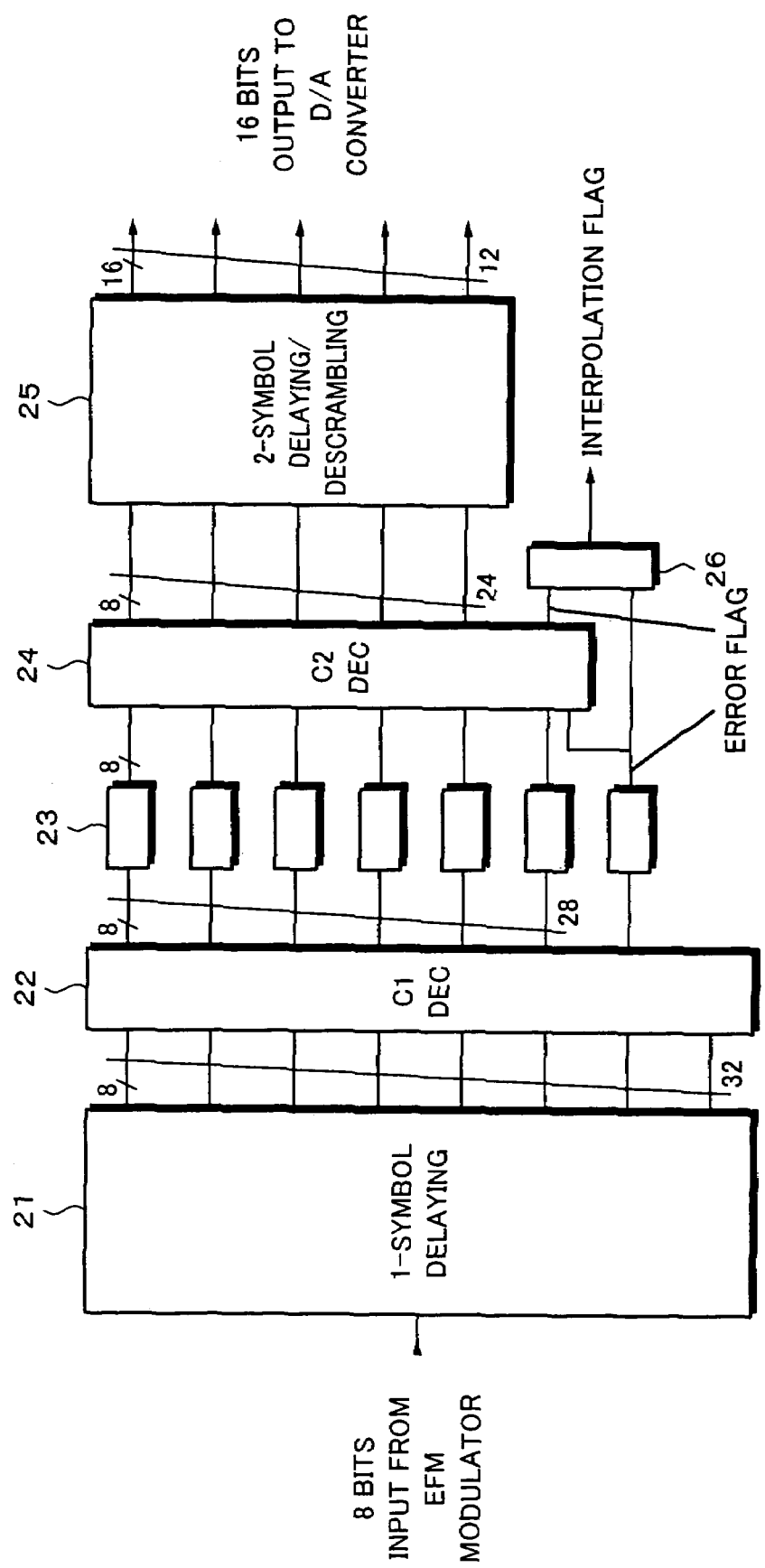
FIG. 7 is a block diagram showing an example of a CIRC decoder.
Figure 8:
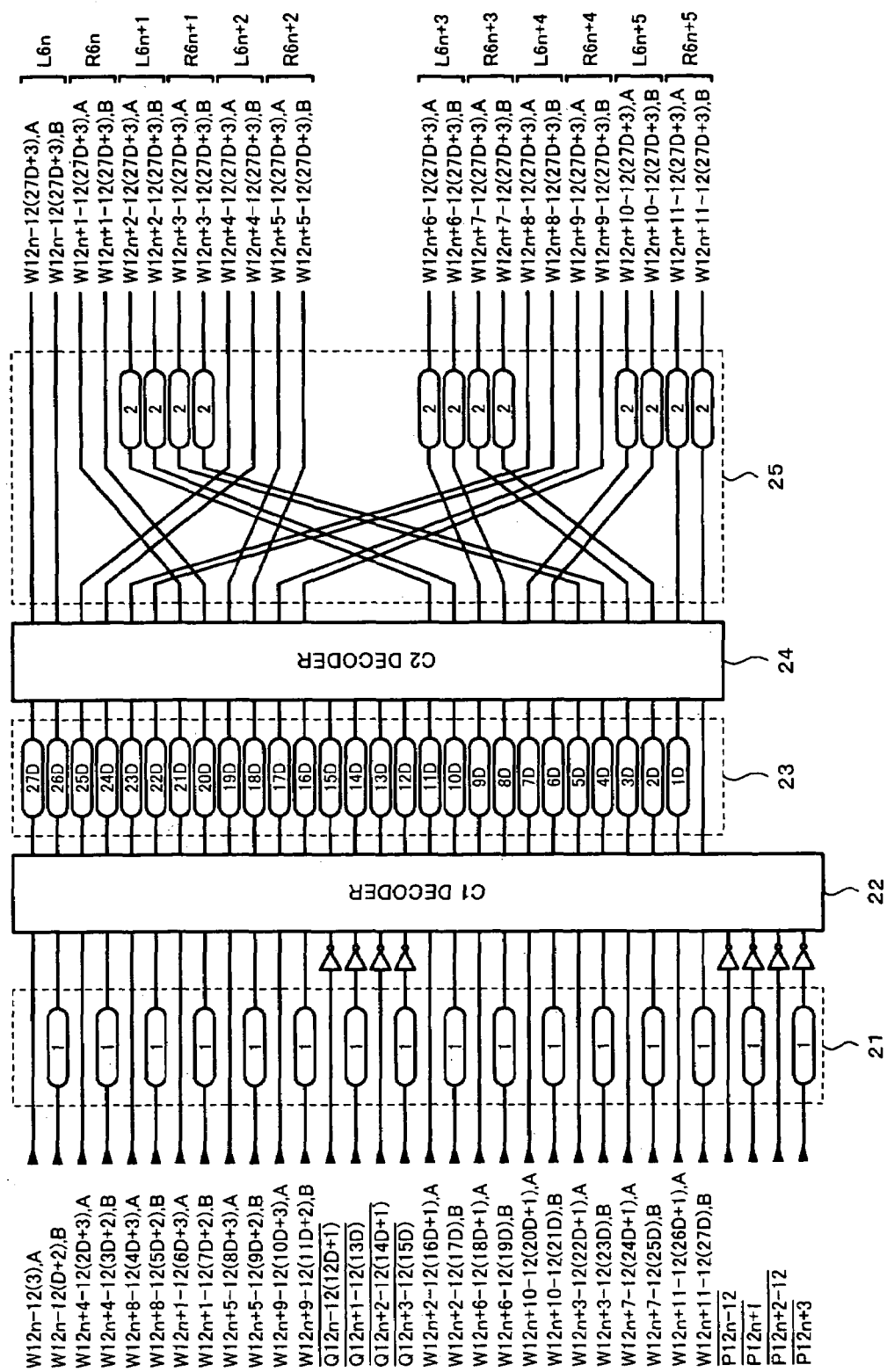
FIG. 8 is a detailed block diagram showing the example of the CIRC decoder.

FIG. 7 and FIG. 8 are block diagrams showing a flow of the decoding process. The decoding process is performed in the reverse order of the forgoing encoding process.

Reproduction data that is output from the EFM demodulating circuit is supplied to a one-symbol delaying circuit 21. The delay assigned by the one-symbol delaying circuit 15 on the encoding side is cancelled by the circuit 21.

32 symbols that are output from the one-symbol delaying circuit 21 are supplied to a C1 decoder 22. Outputs of the C1 decoder 22 are supplied to a de-interleaving circuit 23. The de-interleaving circuit 23 assigns delay amounts 27D, 26D, . . . , D, and 0 that vary in arithmetic progression to the 28 symbols so that the delay amounts assigned by the interleaving circuit 13 are cancelled.

According to the CIRC4 system, the unit delay amount of the de-interleaving circuit 23 is D=4 frames. According to the CIRC7 system, the unit delay amount of the de-interleaving circuit 23 is D=7 frames.

Outputs of the de-interleaving circuit 23 are supplied to a C2 decoder 24. The C2 decoder 24 decodes the outputs of the de-interleaving circuit 23 with the C2 code. 24 symbols that are output from the C2 decoder 24 are supplied to a two-symbol delaying/descrambling circuit 25. 24 symbols of decoded data are obtained from the two-symbol delaying/descrambling circuit 25.

With error flags that are output from the C1 decoder 22 and the C2 decoder 24, an interpolation flag generating circuit 26 generates an interpolation flag. With the interpolation flag, data that represents an error is interpolated.

In such a manner, according to the CIRC, the error correction code encoding process is performed with the C1 sequence in the vertical direction. In addition, the error correction code encoding process is performed with the C2 sequence in the diagonal direction. Thus, the error correction code encoding process is dually performed. The CIRC4 system and the CIRC7 system differ in their interleave lengths.

Figure 9:
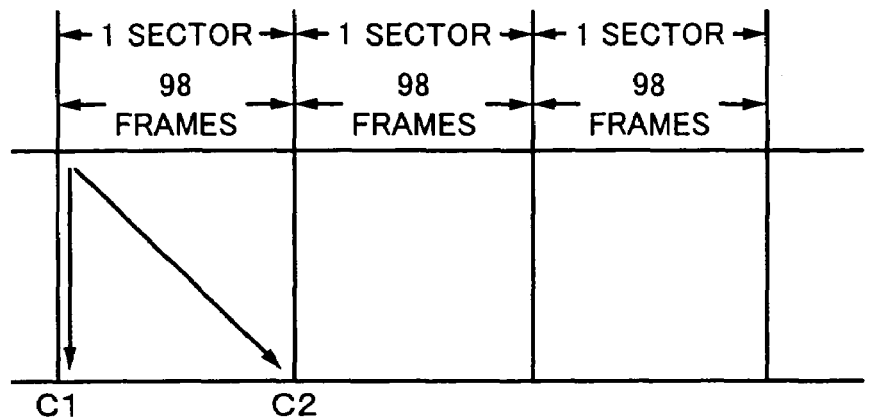
FIG. 9 is a schematic diagram for describing interleaving according to the CIRC4 system.
Figure 10:
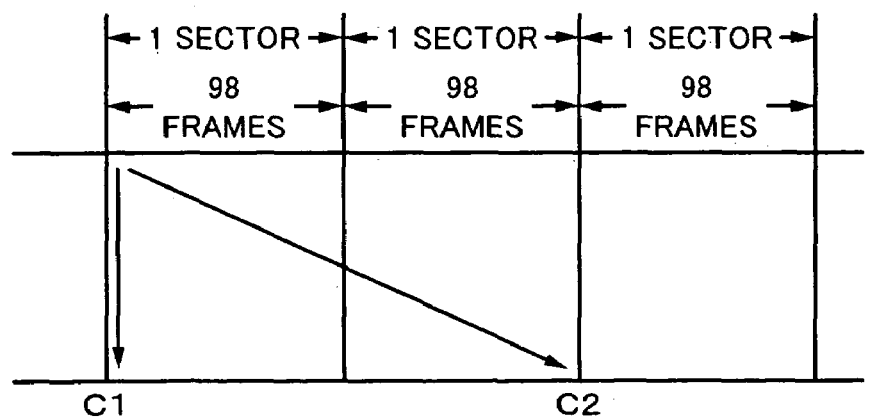
FIG. 10 is a schematic diagram for describing interleaving according to the CIRC7 system.

According to the CIRC4 system, as shown in FIG. 9, the unit delay amount D is (D=4). The total interleave length is 109 (=108+1) frames. Thus, according to the CIRC4 system, the total interleave length is slightly larger than the data length of one sector. According to the CIRC7 system, as shown in FIG. 10, the unit delay amount D is (D=7). The total interleave length is 190 (=189+1) frames. Thus, according to the CIRC7 system, the total interleave length is slightly shorter than the data length of two sectors.

The total interleave length defines an error correction performance against a burst error of which many pieces of data successively become errors due to a fingerprint adhered on an optical disc, a scratch on an optical disc, or the like. The longer the total interleave length, the higher the burst error correction performance is. In a double density CD, it is desired to improve a correction performance against a burst error. Thus, for a double density CD, it is considered to improve the correction performance against the burst error with an error correction code according to the CIRC7 system.

As described above, on the optical disc 1 according to the present invention, data that has been encoded with an error correction code according to the CIRC7 system is recorded to the area AR2. In addition, a pattern of data that can be corrected according to both the CIRC7 system and the CIRC4 system is contained in the area AR2. Next, data that can be corrected according to both the CIRC7 system and the CIRC4 system will be described.

As was described above, since the CIRC4 system and the CIRC7 system differ in their interleave lengths, data that has been encoded with the error correction code according to the CIRC7 system cannot be decoded by a decoder according to the CIRC4 system. In contrast, data that has been encoded with the error correction code according to the CIRC4 system cannot be decoded by the decoder according to the CIRC7 system.

However, data having a particular arrangement can be decoded by both the decoder according to the CIRC4 system and the decoder according to the CIRC7 system. That means that the data can be logically corrected (correction impossibility does not take place). Thus, when an optical disc has a large scratch or the like, of course, it results in correction impossibility.

Figure 11:
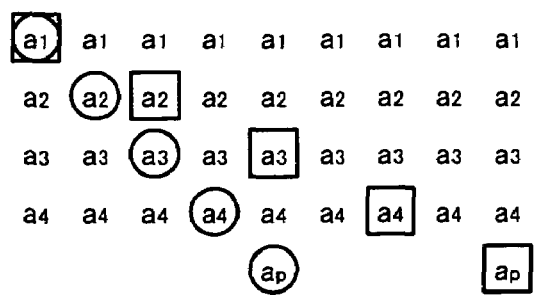
FIG. 11 is a schematic diagram for describing data that can be corrected according to both the CIRC4 system and the CIRC7 system.

FIG. 11 describes a data array that can be decoded by any one of a decoder according to the CIRC4 system and a decoder according to the CIRC7 system. In the data array shown in FIG. 11, when data is two-dimensionally arrayed, predetermined data is repeated as one unit in the vertical direction, namely in the unit of a C1 sequence. In the example, data is repeated as one unit of a1, a2, a3, and a4 in the vertical direction.

In such a data array, the same data is arranged in the horizontal direction. In other words, as shown in FIG. 11, data of the first row in the horizontal direction is all a1. Data of the second row in the horizontal direction is all a2. Data of the third row in the horizontal direction is all a3. Data of the fourth row in the horizontal direction is a4. In such a manner, the same data is arranged in the horizontal direction.

When data is arrayed in such a manner, like the C1 sequence, the C2 sequence according to the CIRC4 system is the same as the C2 sequence according to the CIRC7 system. In other words, in the example shown in FIG. 11, regardless of the total interleave length (namely, the angle of the diagonal direction), the parity of the C2 sequence is always composed of a1, a2, a3, and a4.

Thus, when data is arrayed in such a manner, data that has been encoded with the error correction code according to the CIRC7 system can be decoded by a decoder according to the CIRC4 system. Reversely, data that has been encoded with the error correction code according to the CIRC4 system can be decoded by a decoder according to the CIRC7 system.

Thus, since the interleave length according to the CIRC4 system is different from the interleave length according to the CIRC7 system, when data that has been encoded with the error correction code according to the CIRC7 system is decoded by a decoder according to the CIRC4 system or when data that has been encoded with the error correction code according to the CIRC4 system is decoded by a decoder according to the CIRC7 system, a correction impossibility error is detected. However, as was described above, with an array of which predetermined data is repeated in the vertical direction, the data can be decoded by any one of a decoder according to the CIRC7 system and a decoder according to the CIRC4 system.

According to the embodiment of the present invention, using a characteristic of data that can be corrected by a decoder according to the CIRC7 system and a decoder according to the CIRC4 system, encryption key data is recorded to a disc. Using the CIRC7 system, encryption key data cannot be reproduced by a conventional CD player and a conventional CD-ROM drive. As a result, the secrecy of the encryption key data can be improved. In addition, to improve the secrecy, various measures are taken. As one measure, the position of the area AR2 is kept secret. Next, a data recording method and a data recording method for the area AR2 will be described in practice.

Figure 12A:
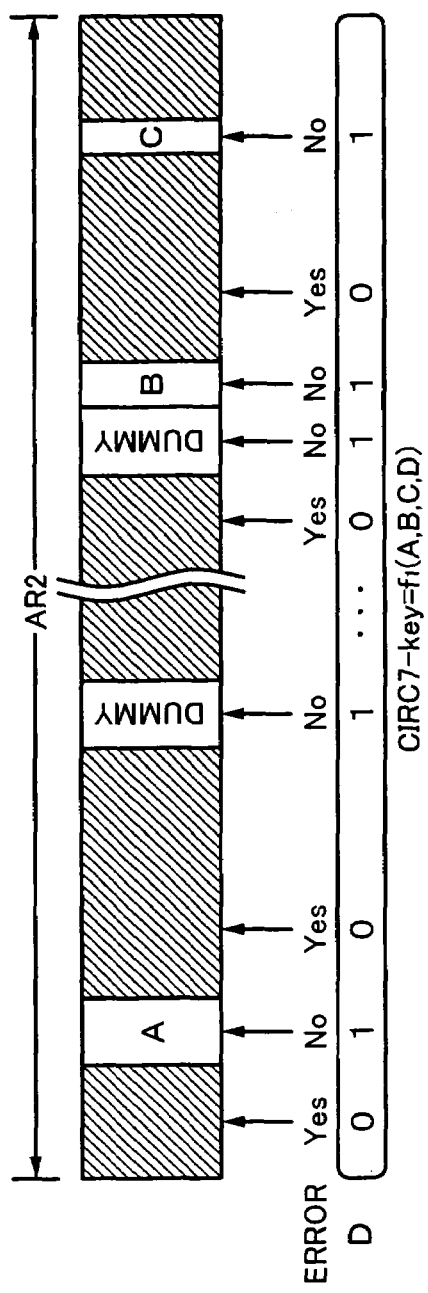
FIGS. 12A and B are schematic diagrams for describing an area that has been encoded according to the CIRC7 system on the optical disc according to the present invention.

FIG. 12A shows a structure of for example one track (one music program of music data) recorded to the area AR2 of the second program area PA2 on the optical disc 1 shown in FIG. 1 and FIG. 2.

Figure 12B:
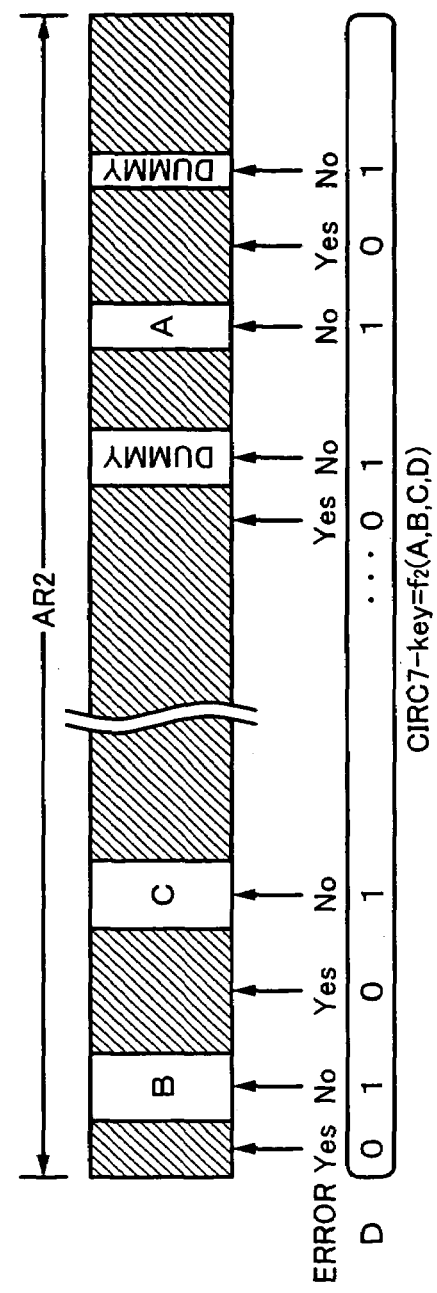

As was described above, in the area AR2, a data pattern that has been encoded with an error correction code according to the CIRC7 system and that can be corrected according to both the CIRC7 system and the CIRC4 system is contained. In FIGS. 12A and 12B, data A, dummy data, . . . , dummy data, data B, and data C represent recorded portions that can be corrected according to both the CIRC7 system and the CIRC4 system is recorded. The other portions (hatched areas) represent recorded portions that are detected as error correction impossible portions when they are decoded according to the CIRC4 system. Data that can be corrected according to both the CIRC7 system and the CIRC4 system is data of which predetermined data is repeated as one unit in the vertical direction (C1 sequence).

When the area AR2 is decoded according to the CIRC4 system, the data A can be corrected. Thus, no error is detected from the data A (denoted by No in FIG. 12A). In contrast, hatched areas are detected as error correction impossible portions (denoted by Yes in FIG. 12A). In the example, if no error is decoded, there are two cases. In the first case, the original data does not contain an error. In the second case, an error contained in data is corrected. In reality, there is a possibility of which an error cannot be corrected according to the CIRC4 system due to a scratch, a fingerprint, or the like on an optical disc.

Although an error correcting process is performed for each of the C1 sequence and the C2 sequence, an error correction impossible state is detected with an error corrected result that is read (sampled) at a predetermined position of the C2 sequence. In each portion, data of for example several ten bytes has been recorded. Thus, error corrected results of the C2 sequence can be securely read. In that case, a plurality of error corrected results may be read at individual positions so as to securely detect error corrected results of the C2 sequence. Assuming that when errors are corrected according to the CIRC4 system, an error correction impossible portion is assigned one bit "0" and a no-error portion (of which an error can be corrected) is assigned one bit "1", data D (0101 . . . 01101) is obtained.

According to the embodiment of the present invention, the data A, B, and C, which can be corrected according to the CIRC4 system, are used as encryption key data or a part thereof. In addition, according to the embodiment, the data D, which represents error correction impossible portions and error correction possible and no-error portions, is used as encryption key data or a part thereof. In other words, when encryption key data is denoted by CIRC7-key, the encryption key data is generated by the following formula.

CIRC7-key=$f_1$ (A, B, C, and D)

where $f_1$ is a particular key generation function. To further improve the secrecy of the encryption key, dummy data is recorded.

There are several methods for improving the secrecy of encryption key data. The method shown in FIG. 12A is referred to as first recording method, whereas FIG. 12B shows a second recording method. When the second recoding method is compared with the first recording method, the positions of data (A, B, and C) of which no correction impossibility take place according to both the CIRC4 system and the CIRC7 system have been changed. In addition, the reading position of error corrected results have been changed. In addition, the key generation function $f_1$ has been changed to $f_2$. Whenever data is recorded to a recordable optical disc, the first recording method and the second recording method are alternately used. As a result, the secrecy of the encryption key data can be improved. When a read-only optical disc is used, that process is performed in a mastering process. For example, a plurality of stampers according to the first recording method and the second recording method are produced.

When application software that runs on a personal computer (PC) using a PC drive reads key data, position information thereof may be obtained from commands issued to the drive. To prevent such a problem, the following process will be performed.

FIGS. 13A and 13B show a method for improving the secrecy of encryption key data using the reading method for the encryption key data. Data for example A that can be corrected according to both the CIRC7 system and the CIRC4 system is recorded at a plurality of positions in the area AR2. When the data A is read from the area AR2, the reading position is changed. In FIG. 13A, the first data A is read. In FIG. 13B, the second data A is read. For example, the reading position is changed whenever a reproduction is performed. Besides the data A, that method can be applied to the data B, data C, and dummy data.

Figure 14A:
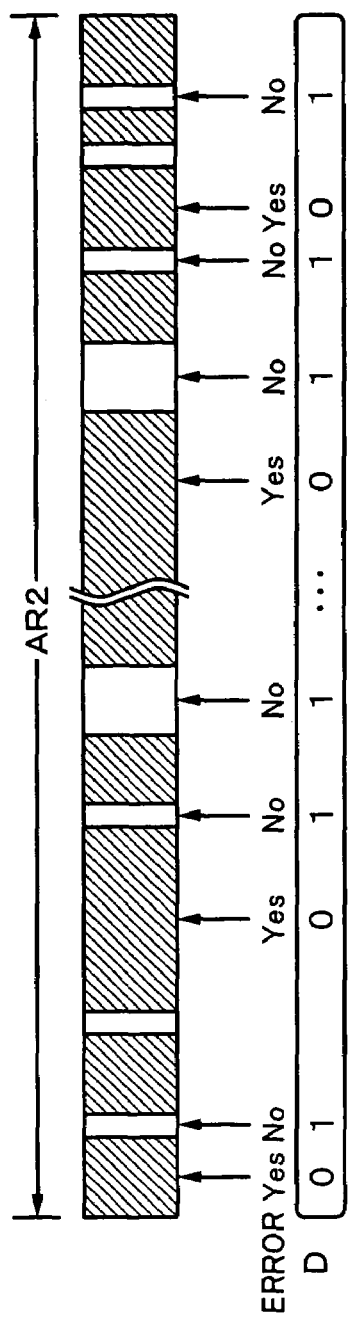
FIGS. 14A an B are schematic diagrams for explaining an area that has been encoded according to the CIRC7 system on the optical disc according to the present invention.
Figure 14B:
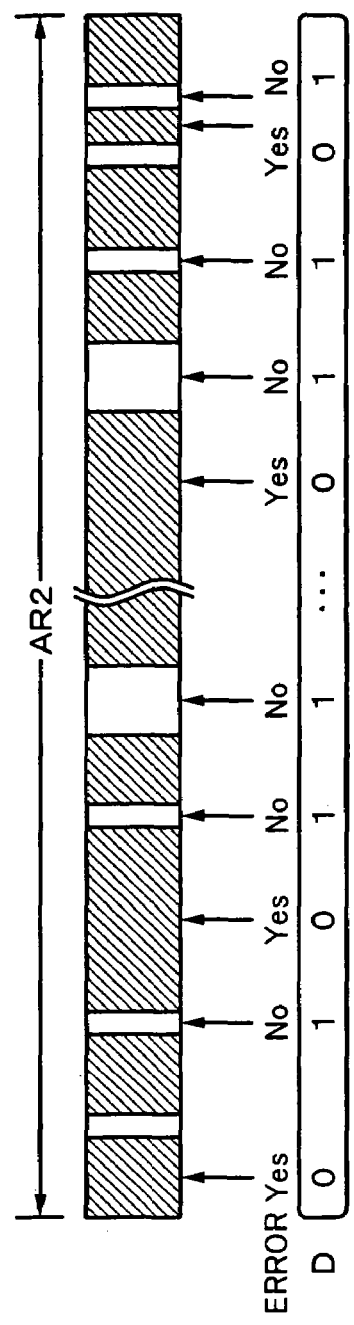

FIGS. 14A and 14B show a method for improving the secrecy of encryption key data using the reading method for the encryption key data. In this example, the reading method for the data D is changed depending on error correction impossible or error correction possible. In other words, as shown in FIG. 14A and FIG. 14B, the reading positions are changed. For example, whenever a reproduction is performed, the reading positions are changed. In that case, even if the reading positions are changed, the obtained data D is the same.

FIG. 15A shows a method for reading predetermined data and other data with one read command as denoted by an arrow mark in the case that the predetermined data that can be corrected according to both the CIRC4 system and the CIRC7 system is recorded at a predetermined position. FIG. 15B shows a method for issuing not only a true read command (command 2) for reading predetermined data but false read commands (command 1 and command 2) so as to cause the predetermined data not to be easily seen.

In FIG. 16A and FIG. 16B, when the area AR2 that has been encoded according to the CIRC7 system is read, although the reading positions are fixed, the reading order is changed. For example, 59 reading positions have been designated. Whenever the area AR2 is read, the reading order is changed. Although FIGS. 16A and B show only two orders, there are many reading orders.

FIG. 17 shows an example using a semiconductor memory (buffer memory). Whole data that is read from the area AR2 is copied to the buffer memory. Thereafter, data is read from a predetermined address of the buffer memory. The data is error-corrected according to the CIRC4 system. Data D corresponding to the error-corrected result is generated. Since the data of the area AR2 has been stored in the buffer memory, the way that encryption key data is generated cannot be seen from the outside. As a result, the secrecy of the encryption key data can be improved. Preferably, the buffer memory is tamper resistant.

In that example, as shown in FIG. 1 and FIG. 2, the optical disc is a two-session optical disc, which is divided into an inner periphery area and an outer periphery area where data according to the CD-DA standard is recorded in one area and compressed audio data is encrypted and recorded in the other area. However, as shown in FIG. 18, of course, a one-session optical disc can be used.

Figure 18:
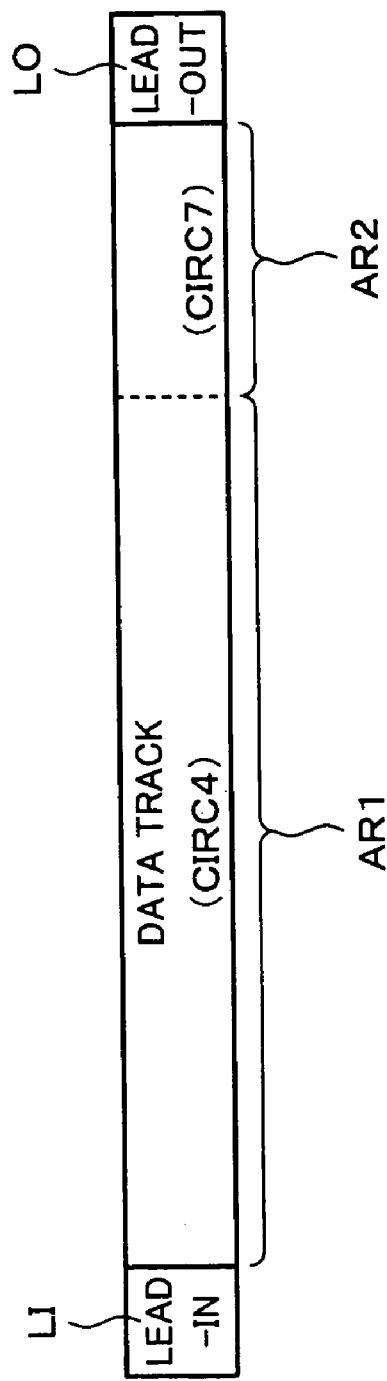
FIG. 18 is a schematic diagram for describing another example of an optical disc according to the present invention.

In the example shown in FIG. 18, on the innermost periphery of the optical disc, a first lead-in area LI is formed. On an outer periphery of the area LI, a program area PA is formed. Outside the program area PA, a lead-out area LO is formed. The program area is divided into an area AR11 and an area A12. In the area AR11, data is encrypted, encoded with an error correction code according to the CIRC4 system, and recorded. In the area AR12, data is encoded with an error correction code according to the CIRC7 system and recorded. The data recorded in the area AR12 contains a data pattern that can be corrected according to both the CIRC7 system and the CIRC4 system.

Figure 19:
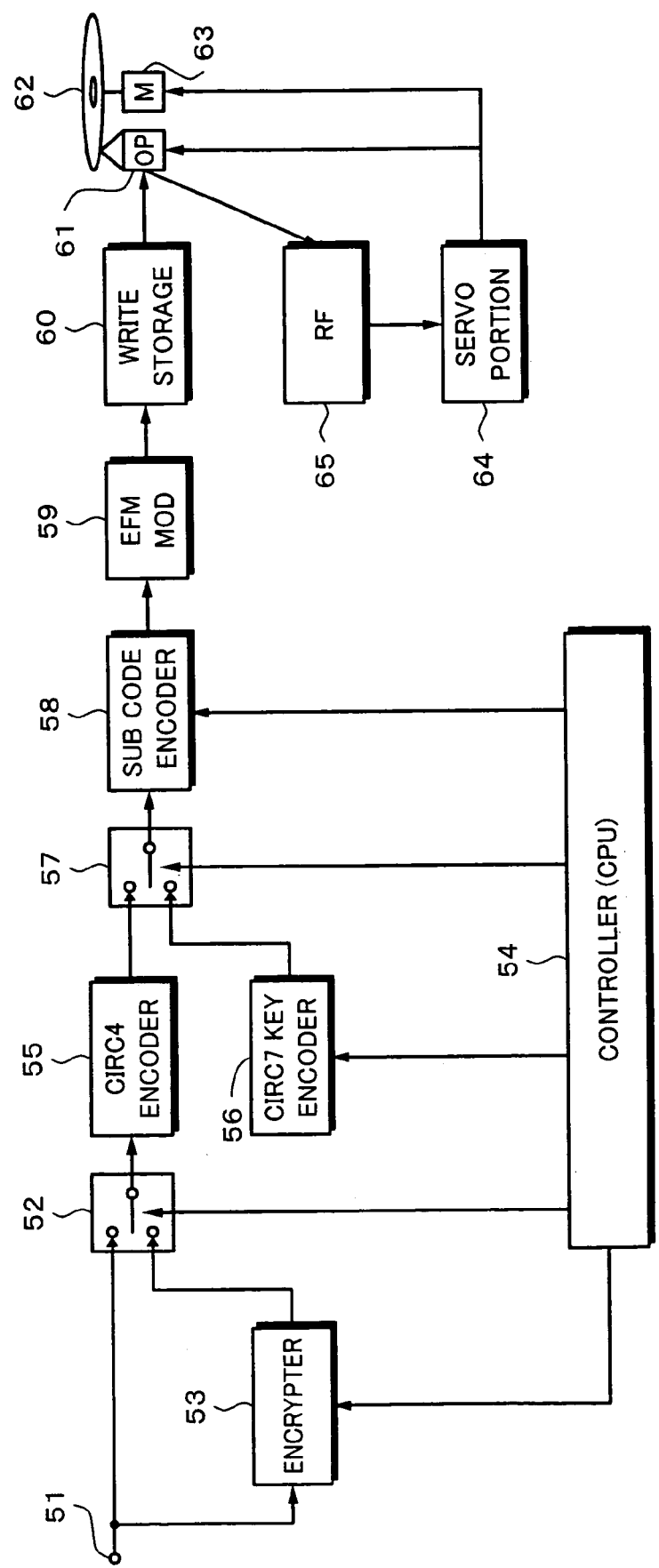
FIG. 19 is a block diagram showing an example of an optical disc recording apparatus according to the present invention.

FIG. 19 shows a recording apparatus according to an embodiment of the present invention. For simplicity, according to the embodiment, data is recorded to a one-session optical disc 62 as shown in FIG. 18. When the one-session optical disc 62 is a read-only disc, a structure shown in FIG. 19 is applied as a mastering system. In FIG. 19, content data to be recorded is supplied to an input terminal denoted by reference numeral 51. An example of the content data is audio data that has been compressed according to the ATRA3. However, besides audio data, the present invention can be applied to video data and music and video data. Alternatively, content data that has been encrypted may be supplied to the input terminal 51. Alternatively, part of the content data may be encrypted.

The input data is supplied to a first input terminal of a switch circuit 52. In addition, the input data is encrypted by an encrypter 53 and then supplied to a second input terminal of the switch circuit 52. The switch circuit 52 is controlled by a controller (CPU) 54 that controls the whole recording apparatus. A display, an operation switch, and so forth (not shown) are connected to the controller 54. Depending on whether or not the input data is to be encrypted, the switch circuit 52 is controlled by the controller 54. Encryption key data (CIRC7 -key) is supplied from the controller 54 to the encrypter 53.

Output data of the switch circuit 52 is supplied to a CIRC4 encoder 55. The CIRC4 encoder 55 encodes the supplied data with an error correction code according to the CIRC4 system. Output data of the CIRC4 encoder 55 is supplied to a first input terminal of a switch circuit 57. Output data of an encryption key (CIRC7-key) encoder 56 is supplied to a second input terminal of the switch circuit 57. Data (including dummy data) that composes the encryption key data or a part thereof that has been used in the encrypter 53 is supplied from the controller 54 to the encryption key encoder 56. In other words, the encryption key encoder 56 generates data recorded in the area AR2 encoded according to the CIRC7 system (see FIGS. 12A, 12B, and so forth).

The CIRC4 encoder 55 dually performs an error correction code encoding process for a C1 sequence (in the vertical direction) and a C2 sequence (in the diagonal direction). When the error correction code encoding process is performed according to the CIRC4 system, the delay unit D is (D=4 frames) and the maximum delay amount is 27D (=108 frames). The encryption key encoder 56 dually performs an error correction code encoding process for the C1 sequence (in the vertical direction) and the C2 sequence (in the diagonal direction). When the error correction code encoding process is performed corresponding to the CIRC7 system, the delay unit D is (D=7 frames) and the maximum delay amount is 27D (=189 frames).

The switch circuit 57 is controlled by the controller 54. In the example shown in FIG. 18, the switch circuit 57 is controlled by the controller 54 so that data encoded according to the CIRC4 system is recorded in the data track AR1 and data encoded according to the CIRC7 system is recorded in the data track AR2. As was described above, to improve the secrecy of the encryption key data, whenever data is recorded, when the positions of data that can be corrected according to both the CIRC4 system and the CIRC7 system is changed, the controller 54 supplies data that has been controlled in such a manner to the encryption key encoder 56.

Output data of the switch circuit 57 is supplied to a sub code encoder 58. The controller 54 supplies sub code data to the sub code encoder 58. The sub code encoder 58 adds a sub code to the data supplied from the switch circuit 57 so as to convert the supplied data into a predetermined record data format. Output data of the sub code encoder 58 is EFM-modulated by an EFM modulator 59. The EFM modulated data is supplied to a write storage portion 60. The write storage portion 60 is a circuit that controls a data recording method. The write storage portion 60 performs a process for multiplex-recording for the area AR2, a process for changing a track on which encryption key data is recorded, or the like.

An output of the write storage 60 is supplied to an optical pickup 61. The optical pickup 61 outputs a laser beam that has been modulated corresponding to the output data of the write storage 60. The laser beam is radiated on a recording surface of the optical disc 62. As a result, the data is recorded to the optical disc 62.

The optical disc 62 is held on a turn table and rotated by a spindle motor 63. The spindle motor 63 is driven and rotated at constant linear velocity (CLV) or constant angular velocity (CAV) under the control of a servo portion 64. The servo portion 64 generates various types of servo drive signals such as focus servo drive, tracking servo drive, and spindle servo drive corresponding to a focus error signal and a tracking error signal supplied from an RF portion 65 and an operation command supplied from the controller 54 and outputs the generated signals to the optical pickup 61 and the spindle motor 63.

The optical pickup 61 collects laser light as an optical beam of a semiconductor laser as a light source to a signal surface of the optical disc 62 with an objective lens and scans the signal surface of the optical disc 62 so that tracks are formed in a concentric circle shape or in a spiral shape on the optical disc 62. The objective lens of the optical pickup 61 is traveled in a focus direction and a tracking direction by an actuator (not shown). The whole optical pickup 61 can be traveled in a radius direction of the optical disc 62 by a thread mechanism (not shown).

Figure 20:
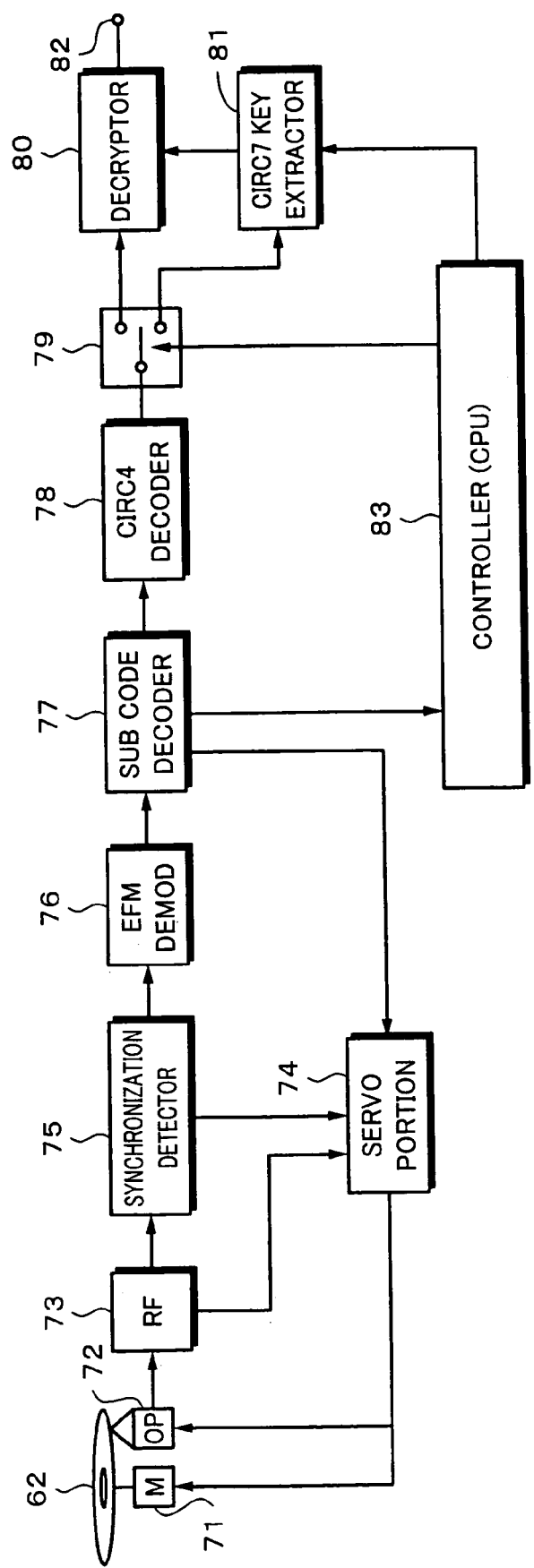
FIG. 20 is a block diagram showing an example of an optical disc reproducing apparatus according to the present invention.

FIG. 20 shows an example of a reproducing apparatus that reproduces data from the forgoing optical disc 62. The optical disc 62 is held on a turn table and rotated by a spindle motor 71. The spindle motor 71 is driven and rotated at constant linear velocity (CLV) or constant angular velocity (CAV) under the control of a servo portion 74.

The servo portion 74 generates various types of servo drive signals of focus servo drive, tracking servo drive, and spindle servo drive corresponding to a focus error signal, a tracking error signal, and an operation command supplied from a controller 83 and outputs the generated signals to the spindle motor 71 and an optical pickup 72. The controller 83 controls the whole reproducing apparatus. A display, an operation switch, and so forth (not shown) are connected to the controller 83. The optical pickup 72 collects laser light of a semiconductor laser as a light source on a signal surface of the optical disc 62 and traces tracks formed in a concentric circle shape or in a spiral shape on the optical disc 62. The whole optical pickup 72 is traveled in the radius direction of the optical disc 62 by a thread mechanism (not shown).

An output signal of the optical pickup 72 is supplied to a synchronization detector 75 through an RF amplifier 73. Output data of the synchronization detector 75 is supplied to an EFM demodulator 76. The demodulator 76 EFM-demodulates the data supplied from the synchronization detector 75. Output data of the demodulator 76 is supplied to a sub code decoder 77. The sub code decoder 77 extracts sub code data from data supplied from the EFM demodulator 76. Output data of the sub code decoder 77 is supplied to a CIRC4 system error correction code decoding circuit (hereinafter referred to as CIRC4 decoder) 78.

When data is reproduced from the optical disc 62, the optical pickup 72 accesses a predetermined position of the optical disc 62 and reproduces a part of the program area PA1. An output signal of the optical pickup 72 is supplied to a CIRC4 decoder 78 through the RF amplifier 73, the synchronization detector 75, the demodulator 76, and the sub code decoder 77.

The CIRC4 decoder 78 performs an error correcting process according to the CIRC4 system. Output data of the CIRC4 decoder 78 is supplied to a switch circuit 79. The switch circuit 79 is controlled by the controller 83. The reproduced content data that has been encrypted is supplied to a decryptor 80. Reproduction data of the area AR2 is supplied to a CIRC7 key extractor 81. The CIRC7 key extractor 81 generates encryption key data. The generated encryption key data is supplied to the decryptor 80. The decryptor 80 decrypts the output data of the CIRC4 decoder 78. Reproduced data is output to an output terminal 82.

TOC data and address data of the optical disc 62 are supplied from the sub code decoder 77 to the controller 83. When the optical disc 1 shown in FIG. 1 is loaded to the reproducing apparatus, the area PA2 is accessed. The optical pickup 72 reads data from the program area PA2 and generates encryption key data. Thereafter, content data of the program area PA2 is reproduced.

In the forgoing optical disc 62, in the area AR2, data that has been encoded with an error correction code according to the CIRC7 system contains data that can be corrected according to both the CIRC4 system and the CIRC7 system. However, when this portion is mistakenly reproduced as a sound, a uncomfortable sound will be generated. Thus, in the data portion that can be corrected according to both the CIRC4 system and the CIRC7 system, all high order bits of the PCM signal are set to 0 or 1 so that the level of the sound becomes low.

When a sound that is generated in a data portion that can be corrected according to both the CIRC4 system and the CIRC7 system is a direct current or a radio frequency wave, since the user cannot easily recognize it, there is a risk of which he or she turns up the volume. Thus, data 0s and data 1s will be buried in a predetermined pattern so that an audible band sound is generated. For example, data "0s" and data "1s" will be repeated at 7.35 kHz.

In some decoding circuit according to the CIRC system, unless an error takes place in the C1 sequence, an error correction process is not performed for the C2 sequence. For a process of a drive or a player that has such a decoding circuit, in a part of the area AR2, data that can be corrected according to both the CIRC4 system and the CIRC7 system will contain an error of the C1 sequence.

The forgoing example describes the case that the present invention is applied to a data recording medium. Besides the data recording medium, the present invention can be applied to the case that content data is encrypted and transmitted and encrypted data is received. In other words, a predetermined period (frame, packet, or the like) for data that is transmitted and received is a period for data encoded according to the CIRC7 system. In the same manner as described above, an encryption key can be buried in the data period.

When the present invention is applied to data transmission and reception, the structure of the recording system shown in FIG. 19 corresponds to the structure of the transmitting system. An output of the switch circuit 57 is supplied to the transmitting portion and transmitted to a wired or wireless communication path. The structure of the reproducing system shown in FIG. 20 corresponds to the structure of the receiving system. The received data is supplied to the RF amplifier 73. Data that has been received and decrypted is obtained from the decryptor 80.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. In the forgoing example, data that can be corrected according to both the CIRC4 system and the CIRC7 system was described. As long as the encoding structure is the same, predetermined data that is repeated as one unit in the vertical direction (C1 sequence) can be corrected regardless of the interleave length.

In addition, besides the CIRC, data that can be corrected according to a plurality of error correction systems can be extended to another encoding system for performing an error correction code encoding process according to two sequences. For example, like the CIRC, using a product code with which an encoding process is performed in the horizontal direction and the vertical direction, data that can be corrected according to a plurality of encoding systems can be considered.

According to the present invention, an optical disc as a data recording medium has an area in which data is encoded with an error correction code according to the CIRC7 system. In the area, data that can be corrected according to both the CIRC4 system and the CIRC7 system is recorded at a predetermined position in a predetermined pattern. Since the data that can be corrected is used as an encryption key or a part thereof, the secrecy of the encryption key can be improved while the influence to a conventional apparatus is reduced. In addition, when the structure of the area and so forth are varied in various manners, the encryption key can be kept more secret.

DESCRIPTION OF REFERENCE NUMERALS

1 OPTICAL DISC
53 ENCRYPTER
55 CIRC4 ENCODER
56 CIRC7 KEY ENCODER
78 CIRC4 DECODER
80 DECRYPTOR
81 CIRC7 KEY EXTRACTOR

The invention claimed is:

1. A recording medium comprising:
an area in which data that has been encoded with a first error correction code is recorded,
wherein data to be decoded with a second error correction code that is different from the first error correction code is recorded to the area along with the data that has been encoded with the first error correction code,
wherein the data to be decoded with the second error correction code composes at least part of encryption key data, and
wherein the first error correction code and the second error correction code are used to encode at least two encoding sequences in respective directions, the first error correction code and the second error correction being different only in the encoding sequences, the data to be decoded being data of which predetermined data is repeated as one unit of one of the two encoding sequences in the respective directions.

2. The recording medium as set forth in claim 1,
wherein the data to be decoded with the second error correction code is recorded to the area along with the data that has been encoded with the first error correction code so that when the data that is read from the area is decoded with the second error correction code, the decoded data represents a predetermined error pattern corresponding to the encryption key data.

3. The recording medium as set forth in claim 2,
wherein the data to be decoded with the second error correction code is data to be also decoded with the first error correction code.

4. The recording medium as set forth in claim 1,
wherein at least part of the data to be decoded with the second error correction code is dummy data.

5. A recording medium, comprising:
an area in which data that has been encoded with a first error correction code is recorded,
wherein data to be decoded with a second error correction code that is different from the first error correction code is recorded to the area along with the data that has been encoded with the first error correction code,
wherein the data to be decoded with the second error correction code composes at least part of encryption key data, and
wherein the first error correction code and the second error correction code are a code with which a C1 sequence in a vertical direction is encoded and a code with which a C2 sequence in a diagonal direction is encoded, respectively, the first error correction code and the second error correction code being different in their interleave lengths, the data to be decoded being predetermined data repeated as one unit of the C1 sequence.

6. The recording medium as set forth in claim 5,
wherein the data to be decoded contains an error of the C1 sequence.

7. The recording medium as set forth in claim 5,
wherein the portion of which the data encoded with the first error correction code is recorded along with the data to be decoded in such a manner that all high order bits have the same values.

8. The recording medium as set forth in claim 5,
wherein the portion of which the data encoded with the first error correction code is recorded along with the data to be decoded in such a manner that when the portion is reproduced, an audible band sound is generated.

9. The recording medium as set forth in claim 8,
wherein the portion of which the data encoded with the first error correction code is recorded along with the data to be decoded in such a manner that data 0s and 1s are repeated in a predetermined period.

10. A recording method for a recording medium, comprising;
recording data that has been encoded with a first error correction code to a recording area of the recording medium; and
recording data that composes at least a part of encryption key data and to be decoded with a second error correction code that is different from the first error correction code to the area along with the data that has been encoded with the first error correction codes,
wherein the first error correction code and the second error correction code are used to encode at least two encoding sequences in respective directions, the first error correction code and the second error correction being different only in the encoding sequences, the data to be decoded being data of which predetermined data is repeated as one unit of one of the two encoding sequences in the respective directions.

11. The recording method for the recording medium as set forth in claim 10, wherein the encryption key data contains data that represents whether or not data that has been read from the area and decoded with the second error correction code has an error.

12. The recording method for the recording medium as set forth in claim 11,
wherein the data to be decoded with the second error correction code is data that can be also decoded with the first error correction code.

13. The recording method for the recording medium as set forth in claim 10,
wherein the second recording step is performed by recording the data to be decoded with the second error correction code to the area along with the data that has been encoded with the first error correction code so that when the data that is read from the area is decoded with the second error correction code, the decoded data represents a predetermined error pattern corresponding to the encryption key data.

14. The recording method for the recording medium as set forth in claim 10,
wherein at least part of the data to be decoded with the second error correction code is dummy data.

15. A recording method for a recording medium, comprising:
recording data that has been encoded with a first error correction code to a recording area of the recording medium; and
recording data that composes at least a part of encryption key data and to be decoded with a second error correction code that is different from the first error correction code to the area along with the data that has been encoded with the first error correction code,
wherein the first error correction code and the second error correction code are a code with which a C1 sequence in a vertical direction is encoded and a code with which a C2 sequence in a diagonal direction is encoded, respectively, the first error correction code and the second error correction code being different in their interleave lengths, the data to be decoded being predetermined data repeated as one unit of the C1 sequence.

16. The recording method for the recording medium as set forth in claim 15,
wherein the data to be decoded contains an error of the C1 sequence.

17. The recording method for the recording medium as set forth in claim 15,
wherein the second recording step is performed by recording the portion of which the data encoded with the first error correction code along with the data to be decoded in such a manner that all high order bits have the same values.

18. The recording method for the recording medium as set forth in claim 15,
wherein the second recording step is performed by recording the portion of which the data encoded with the first error correction code along with the data to be decoded in such a manner that when the portion is reproduced, an audible band sound is generated.

19. The recording method for the recording medium as set forth in claim 18,
wherein the second recording step is performed by recording the portion of which the data encoded with the first error correction code along with the data to be decoded in such a manner that data 0s and 1s are repeated in a predetermined period.

20. A recording method for a recording medium, comprising:
recording data that has been encoded with a first error correction code to an area of the recording medium along with a plurality of pieces of data to be decoded with the first error correction code and to be also decoded with a second error correction code that is different from the first error correction code as a pattern that represents at least a part of the encryption key data,
wherein the first error correction code and the second error correction code are used to encode at least two encoding sequences in respective directions, the first error correction code and the second error correction being different only in the encoding sequences, the data to be decoded being data of which predetermined data is repeated as one unit of one of the two encoding sequences in the respective directions.

21. The recording method for the recording medium as set forth in claim 20,
wherein the recording step is performed by generating the encryption key data with a generation function having a factor of data to be decoded with the second error correction code and recording the plurality of pieces of the data with the pattern represented by the generated encryption key data.

22. The recording method for the recording medium as set forth in claim 21,
wherein whenever the data is recorded to the recording medium, the generation function is changed.

23. The recording method for the recording medium as set forth in claim 20,
wherein whenever the data is recorded to the recording medium, the recording pattern of the plurality of pieces of the data is changed.

24. The recording method for the recording medium as set forth in claim 20,
wherein the plurality of pieces of the data composes a part of the encryption key data.

25. The recording method for the recording medium as set forth in claim 20,
wherein the recording step is performed by recording the data that has been encoded with the first error correction code along with the plurality of pieces of data to be decoded with the second error correction code so that when data that is read from the area is decoded with the second error correction code, a predetermined error pattern is obtained.

26. A recording method for a recording medium, comprising:
recording data that has been encoded with a first error correction code to an area of the recording medium along with a plurality of pieces of data to be decoded with the first error correction code and to be also decoded with a second error correction code that is different from the first error correction code as a pattern that represents at least a part of the encryption key data,
wherein the first error correction code and the second error correction code are a code with which a C1 sequence in a vertical direction is encoded and a code with which a C2 sequence in a diagonal direction is encoded, respectively, the first error correction code and the second error correction code being different in their interleave lengths, the data to be decoded being predetermined data repeated as one unit of the C1 sequence.

27. The recording method for the recording medium as set forth in claim 26, wherein the data to be decoded contains an error of the C1 sequence.

28. The recording method for the recording medium as set forth in claim 26,
wherein the second recording step is performed by recording the portion of which the data encoded with the first error correction code along with the data to be decoded in such a manner that all high order bits have the same values.

29. The recording method for the recording medium as set forth in claim 26,
wherein the second recording step is performed by recording the portion of which the data encoded with the first error correction code along with the data to be decoded in such a manner that when the portion is reproduced, an audible band sound is generated.

30. The recording method for the recording medium as set forth in claim 29,
wherein the second recording step is performed by recording the portion of which the data encoded with the first error correction code along with the data to be decoded in such a manner that data 0s and 1s are repeated in a predetermined period.

31. A recording apparatus for a recording medium, comprising:
an encoding process portion for performing an encoding process including an error correction code encoding process for input data with a first error correction code;
a recording portion for receiving output data of the encoding process portion and recording the received data to the recording medium; and
a generating portion for generating data to be decoded with the first error correction code, that composes at least a part of encryption key data, and to be decoded with a second error correction code that is different from the first error correction code and supplying the generated data to the encoding process portion,
wherein the first error correction code and the second error correction code are used to encode at least two encoding sequences in respective directions, the first error correction code and the second error correction being different only in the encoding sequences, the data to be decoded being data of which predetermined data is repeated as one unit of one of the two encoding sequences in the respective directions.

32. The recording apparatus for the recording medium as set forth in claim 31,
wherein the plurality of pieces of data to be also decoded with the second error correction code is recorded as a pattern that represents a part of the encryption key data to the recording medium along with the data that has been encoded with the first error correction code.

33. The recording apparatus for the recording medium as set forth in claim 32,
wherein the generating portion is configured to generate the encryption key data with a generation function having a factor of data to be decoded with the second error correction code and supply the generated encryption key data to the encoding process portion.

34. The recording apparatus for the recording medium as set forth in claim 33,
wherein whenever the data is recorded to the recording medium, the generating portion is configured to change the generation function.

35. The recording apparatus for the recording medium as set forth in claim 32,
wherein whenever the data is recorded to the recording medium, the generating portion is configured to change the recording pattern of the plurality of pieces of the data.

36. The recording apparatus for the recording medium as set forth in claim 31,
wherein the generating portion is configured to generate the plurality of pieces of the data to be decoded with the second error correction code along with the data that has been encoded with the first error correction code so that when data that is read from the area is decoded with the second error correction code, a predetermined error pattern is obtained.

37. The recoding medium for the recording medium as set forth in claim 31, further comprising:
an encrypting process portion for performing an encrypting process for the input data and supplying output data thereof to the encoding process portion.

38. A recording apparatus for a recording medium, comprising:
an encoding process portion for performing an encoding process including an error correction code encoding process for input data with a first error correction code;
a recording portion for receiving output data of the encoding process portion and recording the received data to the recording medium; and
a generating portion for generating data to be decoded with the first error correction code, that composes at least a part of encryption key data, and to be decoded with a second error correction code that is different from the first error correction code and supplying the generated data to the encoding process portion.
wherein the first error correction code and the second error correction code are a code with which a C1 sequence in a vertical direction is encoded and a code with which a C2 sequence in a diagonal direction is encoded, respectively, the first error correction code and the second error correction code being different in their interleave lengths, the data to be decoded being predetermined data repeated as one unit of the C1 sequence.

39. The recording apparatus for the recording medium as set forth in claim 38,
wherein the data to be decoded contains an error of the C1 sequence.

* * * * *